(12) United States Patent
Fujimaru et al.

(10) Patent No.: US 7,829,166 B2
(45) Date of Patent: Nov. 9, 2010

(54) OPTICAL DISK

(75) Inventors: Shigeki Fujimaru, Chiyoda-ku (JP);
Chiaki Komori, Chiyoda-ku (JP)

(73) Assignee: Teijin Chemicals Ltd., Tokyo (JP)

( * ) Notice: Subject to any disclaimer, the term of this patent is extended or adjusted under 35 U.S.C. 154(b) by 853 days.

(21) Appl. No.: 11/661,752

(22) PCT Filed: Aug. 31, 2005

(86) PCT No.: PCT/JP2005/016361
§ 371 (c)(1),
(2), (4) Date: Mar. 2, 2007

(87) PCT Pub. No.: WO2006/025587
PCT Pub. Date: Mar. 9, 2006

(65) Prior Publication Data
US 2007/0258351 A1 Nov. 8, 2007

(30) Foreign Application Priority Data
Sep. 2, 2004 (JP) ............................. 2004-255488

(51) Int. Cl.
*B32B 3/02* (2006.01)
(52) U.S. Cl. ................. 428/64.1; 428/64.4; 430/270.11
(58) Field of Classification Search ........................ None
See application file for complete search history.

(56) References Cited

U.S. PATENT DOCUMENTS 6,316,071 B1  11/2001  Chosa et al.

2005/0106350 A1  5/2005  Nishida et al.

FOREIGN PATENT DOCUMENTS

| EP | 1138720 | 10/2001 |
|----|---------|---------|
| JP | 3-100501 | 4/1991 |
| JP | A 3-100501 | 4/1991 |
| JP | 5-186583 | 7/1993 |

(Continued)

OTHER PUBLICATIONS

Japanese Office Action (together with English translation) issued Nov. 26, 2008 in connection with Japanese Patent Application No. 2006-532022 corresponding to the present U.S. application.

(Continued)

*Primary Examiner*—Elizabeth Mulvaney
(74) *Attorney, Agent, or Firm*—Wenderoth, Lind & Ponack, L.L.P.

(57) ABSTRACT

It is an object of the present invention to provide a process for manufacturing a high-density optical disk having excellent optical properties by suppressing the production of a cloud caused by a release failure and preventing the deterioration of hue and light transmittance.

The present invention is a process for manufacturing a high-density optical disk, comprising the steps of:
(1) preparing a resin composition comprising an aromatic polycarbonate resin and a predetermined amount of monoglyceride behenate;
(2) injecting molding the resin composition to obtain a substrate; and
(3) forming an information recording/reproduction layer on the substrate, wherein
the aromatic polycarbonate resin has a sodium metal content of 0.0005 to 0.05 ppm and a viscosity average molecular weight of 10,000 to 20,000, and
the monoglyceride behenate has a sodium metal content of 1 ppm or less.

25 Claims, 1 Drawing Sheet

FOREIGN PATENT DOCUMENTS

| | | |
|---|---|---|
| JP | A 5-186583 | 7/1993 |
| JP | 7-192309 | 7/1995 |
| JP | A 7-192309 | 7/1995 |
| JP | 9-306038 | 11/1997 |
| JP | A 09-306038 | 11/1997 |
| JP | 10-168296 | 6/1998 |
| JP | A 10-168296 | 6/1998 |
| JP | 2000-80261 | 3/2000 |
| JP | A 2000-80261 | 3/2000 |
| JP | 2000-129113 | 5/2000 |
| JP | A 2000-129113 | 5/2000 |
| JP | 2000-207788 | 7/2000 |
| JP | A 2000-207788 | 7/2000 |
| JP | 2000-268404 | 9/2000 |
| JP | A 2000-268404 | 9/2000 |
| JP | 2001-225503 | 8/2001 |
| JP | A 2001-225503 | 8/2001 |
| JP | 2001-253943 | 9/2001 |
| JP | 2003-26793 | 1/2003 |
| JP | A 2003-26793 | 1/2003 |
| JP | 2003-238791 | 8/2003 |
| JP | A 2003-238791 | 8/2003 |
| JP | 2003-301099 | 10/2003 |
| JP | A 2003-301099 | 10/2003 |
| WO | 03/068863 | 2/2003 |

OTHER PUBLICATIONS

"*DOMS XE-blu Diffraction Order Measurement System*", White Paper, dr.schwab Inspection Technology GmbH, pp. 2-19 (2003).
Supplementary European Search Report dated Dec. 1, 2009 in corresponding European Application No. 05782037.

OPTICAL DISK

TECHNICAL FIELD

The present invention relates to a high-density optical disk having a track pitch of 0.74 μm or less.

BACKGROUND ART

An optical disk has a structure that an information recording/reproduction layer is formed on a substrate. The substrate used in the optical disk is manufactured by injection compression molding an aromatic polycarbonate resin (may be abbreviated as PC hereinafter). In this method, a molten resin is injected into a mold in which a stamper as a master having engraved irregularities for forming pits, grooves or lands is installed so as to transfer the irregularities of the master to the surface of the resin, and the substrate is taken out by opening the mold after pressing and cooling steps.

In this method, a failure such as the collapse of the transferred irregularities as shown in FIG. 1 may occur. This is caused by contact between the irregularities of the stamper and the irregularities of the substrate in the step of removing the substrate from the mold. Since a deformed portion of the irregularities looks white and cloudy, it is called "cloud". A product having this cloud is judged as falling short of the appearance quality standards and not accepted. Further, a read signal and a tracking signal designed by using the master cannot be obtained due to the collapse of the irregularities, and the deterioration of the characteristic properties of the optical disk such as a jitter or tracking error occurs. Therefore, high releasability is required to manufacture an optical disk substrate.

Meanwhile, optical disks are divided into conventional optical disks such as CD's (track pitch of 1.6 μm) and high-density optical disks such as DVD's (track pitch of 0.74 μm), Blu-ray disks (track pitch of 0.32 μm) and HD DVD's (track pitch of 0.40 μm). The high-density optical disks have a track pitch of 0.74 μm or less which is narrower than that of the conventional optical disks. Therefore, to mold a high-density optical disk, higher releasability is required.

To improve the releasability of an optical disk substrate at the time of molding, various measures are conceivable. For example, patent document 1 discloses a method in which a fatty acid film is formed on a stamper before molding to reduce bonding strength between the stamper and a resin. However, this method has a drawback that when the number of cumulative shots increases, the film falls off and the above effect is not obtained.

Patent document 2 discloses a method in which an air blow is optimized to suppress a release failure caused by the nonuniformity of the air blow as auxiliary releasing means. However, a release failure is not always caused by the nonuniformity of the air blow and the effect has its limits.

To improve releasability, a release agent to be blended with PC is also under study. For studies on a release agent used to mold a high-density optical disk substrate, molding conditions must also be taken into consideration. That is, to mold a high-density optical disk substrate having a fine structure, the flowability of PC must be raised. To this end, molding must be carried out at about 380° C. which is higher than the molding temperature (340° C.) of a conventional optical disk substrate. Therefore, to mold a high-density optical disk substrate, a release agent suitable for the above molding conditions must be used.

Patent document 3 proposes that PC used for an information recording medium such as an optical disk should be blended with an aliphatic ester having an alkali metal ion content of 100 ppm or less to improve its releasability and hydrolytic resistance. However, this proposal is for a conventional optical disk which is molded at about 340° C., and this technology cannot be applied to a high-density optical disk directly. To mold a high-density optical disk substrate, further studies must be made on the type, amount and alkali metal ion content of the aliphatic ester.

Patent document 4 proposes that PC should be blended with a glycerin monoester having a sodium content of 20 ppm or less to improve its releasability and residence heat stability when it is used as a general molding material. However, releasability in this proposal is the releasability of a general molded product, and this technology cannot be always applied to the molding of an optical disk substrate directly. This proposal merely suggests the molding of PC having a high viscosity average molecular weight which is not suitable for the molding of an optical disk substrate at about 340° C.

Patent document 5 proposes that the amount of the residual sodium contained in PC having a low content of a terminal hydroxyl group should be reduced to 1 ppm or less or a fatty acid monoglyceride should be contained in an amount of 20 to 5,000 ppm in order to prevent the production of a white point on an optical disk at a high temperature and a high humidity. However, as releasability is not taken into account at all and a conventional optical disk which is molded at about 340° C. is targeted in this proposal, this technology cannot be applied to the molding of a high-density optical disk substrate directly.

Patent document 6 proposes that a resin having a low content of a volatile component should be used to reduce the amount of a deposit on a stamper and obtain an excellent high-density optical disk.

(Patent Document 1) JP-A 09-306038

(Patent Document 2) JP-A 2000-207788

(Patent Document 3) JP-A 7-192309

(Patent Document 4) JP-A 10-168296

(Patent Document 5) JP-A 3-100501

(Patent Document 6) JP-A 2000-129113

DISCLOSURE OF THE INVENTION

Studies on a release agent and a resin component for manufacturing a high-density optical disk substrate which is required to have high releasability and molded at a high temperature are unsatisfactory as described above.

It is therefore an object of the present invention to provide a process for manufacturing a high-density optical disk and a substrate thereof efficiently by suppressing the production of a cloud caused by a release failure. It is another object of the present invention to provide a process for manufacturing a high-density optical disk having excellent optical properties and a substrate thereof by preventing the deterioration of hue and light transmittance caused by high-temperature molding.

It is still another object of the present invention to provide a high-density optical disk having excellent heat stability and hydrolytic resistance and a substrate thereof.

It is a further object of the present invention to provide a resin composition which is suitable for the manufacture of a high-density optical disk substrate and has excellent releasability, heat stability and hydrolytic resistance and a manufacturing process thereof.

The inventors of the present invention have conducted intensive studies on a release agent and PC used to mold a high-density optical disk substrate which is molded at a high temperature and required to have high releasability and have found that when monoglyceride behenate (may be abbreviated as GMB hereinafter) having a sodium metal content of less than 1 ppm is used as a release agent, excellent releasability is obtained and the heat stability of PC is improved.

That is, the present invention is a process for manufacturing an optical disk having a track pitch of 0.74 μm or less, comprising the steps of:

(1) preparing a resin composition by adding 0.005 to 0.2 part by weight of monoglyceride behenate to 100 parts by weight of an aromatic polycarbonate resin;

(2) injection molding the resin composition to obtain a substrate having pit tracks, groove tracks, land tracks or land/groove tracks which are arranged at the same interval as the track pitch in the radial direction; and (3) forming an information recording/reproduction layer on the pits, grooves, lands or grooves/lands of the substrate, wherein the aromatic polycarbonate resin has a sodium metal content of 0.0005 to 0.05 ppm and a viscosity average molecular weight of 10,000 to 20,000, and the monoglyceride behenate has a sodium metal content of less than 1 ppm.

The present invention is a process for manufacturing an optical disk substrate having a track pitch of 0.74 μm or less, comprising the steps of:

(1) preparing a resin composition by adding 0.005 to 0.2 part by weight of monoglyceride behenate to 100 parts by weight of an aromatic polycarbonate resin; and (2) injection molding the resin composition to obtain a substrate having pit tracks, groove tracks, land tracks or land/groove tracks which are arranged at the same interval as the track pitch in the radial direction, wherein the aromatic polycarbonate resin has a sodium metal content of 0.0005 to 0.05 ppm and a viscosity average molecular weight of 10,000 to 20,000, and the monoglyceride behenate has a sodium metal content of less than 1 ppm.

Further, the present invention is a process for manufacturing a resin composition for optical disk substrates having a track pitch of 0.74 μm or less, comprising the step (1) of preparing a resin composition by adding 0.005 to 0.2 part by weight of monoglyceride behenate to 100 parts by weight of an aromatic polycarbonate resin, wherein the aromatic polycarbonate resin has a sodium metal content of 0.0005 to 0.05 ppm and a viscosity average molecular weight of 10,000 to 20,000, and the monoglyceride behenate has a sodium metal content of less than 1 ppm.

Further, the present invention includes an optical disk with a track pitch of 0.74 μm or less, having a substrate made of an aromatic polycarbonate resin having a monoglyceride behenate content of 50 to 2,000 ppm, a sodium metal content of 0.05 ppm or less and a viscosity average molecular weight of 10,000 to 20,000.

The present invention also includes an optical disk substrate having a track pitch of 0.74 μm or less, which is made of an aromatic polycarbonate resin having a monoglyceride behenate content of 50 to 2,000 ppm, a sodium metal content of 0.05 ppm or less and a viscosity average molecular weight of 10,000 to 20,000 and which has pit tracks, groove tracks, land tracks or land/groove tracks arranged at the same interval as the track pitch in the radial direction.

The present invention also includes a resin composition for optical disk substrates having a track pitch of 0.74 μm or less, which comprises an aromatic polycarbonate resin having a monoglyceride behenate content of 50 to 2,000 ppm, a sodium metal content of 0.05 ppm or less and a viscosity average molecular weight of 10,000 to 20,000 and which has a change rate (%) in the hue (b value) of its injection molded board having a thickness of 2 mm after 10 minutes of heating at 380° C. of 50% or less and a change rate (%) in the light transmittance of 10% or less.

Figure 1:
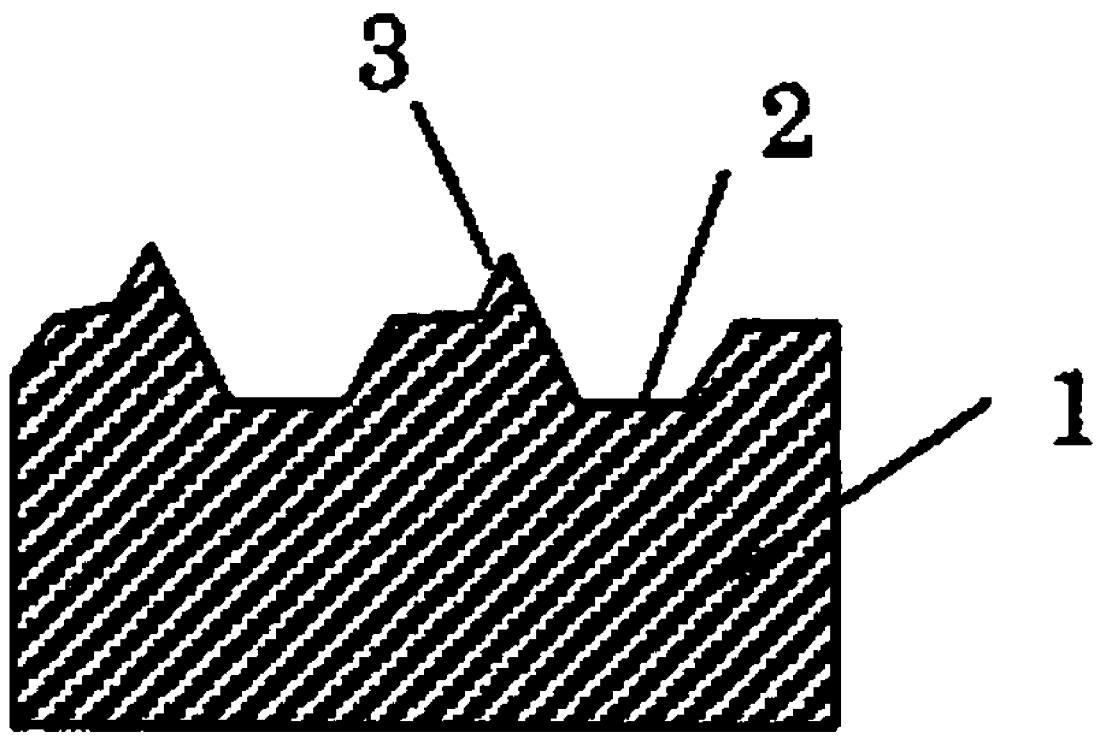
FIG. 1 is a diagram showing the deformation of a groove of a cloud portion.

EXPLANATION OF REFERENCE NUMERALS 1 optical disk substrate
2 groove
3 deformed portion of a groove

BEST MODE FOR CARRYING OUT THE INVENTION

Manufacture of a Resin Composition

The process for manufacturing a resin composition according to the present invention comprises the step (1) of obtaining a resin composition which comprises 100 parts by weight of PC and 0.005 to 0.2 part by weight of GMB. PC has a sodium metal content of 0.0005 to 0.05 ppm and a viscosity average molecular weight of 10,000 to 20,000, and GMB has a sodium metal content of less than 1 ppm.

GMB is added in an amount of preferably 0.03 to 0.09 part by weight, more preferably 0.04 to 0.05 part by weight based on 100 parts by weight of PC. When the amount of GMB is smaller than 0.005 part by weight based on 100 parts by weight of PC, the effect of suppressing the production of a cloud cannot be expected and when the amount is larger than 0.2 part by weight, hue and light transmittance deteriorate and the amount of a deposit may increase to an unneglectable level. The resin composition used in the step (2) can be prepared by carrying out the step (1) or purchasing a resin composition obtained by the step (1).

Monoglyceride Behenate: GMB

GMB is a monoester of behenic acid which is a long-chain fatty acid and glycerin. GMB has a sodium metal content of less than 1 ppm, preferably 0.95 ppm or less, more preferably 0.5 ppm or less, much more preferably 0.1 ppm or less. Specifically, the sodium metal content is 0.05 to less than 1 ppm, more preferably 0.05 to 0.95 ppm, much more preferably 0.05 to 0.5 ppm, most preferably 0.05 to 0.1 ppm.

The sodium metal content of GMB is measured by the following method. That is, 5 g of a sample is dissolved in 50 ml of methylene chloride, 80 ml of pure water is added to the resulting solution under agitation, and the amount of the sodium metal dissolved in the pure water is determined by ion chromatography. The detection limit of this method is 0.05 ppm. When the content of the sodium metal is 1 ppm or more, the manufactured disk substrate deteriorates in hue and the number of white defects produced by the hydrolysis of PC increases with the result of a reduction in the quality of the disk substrate.

The properties of a fatty acid monoglyceride-based release agent are characterized by the number of carbon atoms of a fatty acid moiety. According to the present invention, a fatty acid having a smaller number of carbon atoms than behenic acid is unsatisfactory in the effect of reducing bonding strength between the stamper and the resin. On the contrary, a fatty acid having a larger number of carbon atoms than behenic acid has very low volatility, whereby its amount existent at the interface between the stamper and the resin becomes too small, thereby making unsatisfactory the effect of reducing bonding strength between the stamper and the resin.

GMB having a sodium metal content of less than 1 ppm can be manufactured by producing GMB in accordance with an ordinary method and then purifying it by molecular distillation.

Stated more specifically, after gas matter and a low-boiling material are removed by a spray nozzle type degassing apparatus, glycerin is removed at a distillation temperature of 120 to 150° C. and a vacuum degree of 0.1 to 0.2 Torr by using a flow film type distillation apparatus, and high-purity GMB is obtained as a distillate at a distillation temperature of 160 to 230° C. and a vacuum degree of 0.01 to 0.2 Torr by using a centrifugal molecular distillation apparatus. Metal sodium can be removed as the distillation residue. GMB having a low sodium metal content can be obtained by subjecting the obtained distillate to molecular distillation repeatedly to increase its purity. It is also important to prevent the entry of the sodium metal component from the surrounding environment by cleaning the inside of the molecular distillation apparatus by a suitable method completely in advance and increasing the airtightness of the apparatus. Although GMB can be basically manufactured by these methods, you can ask a professional manufacturer (for example, Riken Vitamin Co., Ltd.) for the manufacture of GMB based on your specifications.

Aromatic Polycarbonate Resin: PC

This PC has a sodium metal content of 0.0005 to 0.05 ppm, preferably 0.0005 to 0.01 ppm, more preferably 0.0005 to 0.005 ppm. PC having a sodium metal content of 0.05 ppm or less can be manufactured by diluting PC manufactured by interfacial polymerization with methylene chloride after the end of the reaction to obtain an organic solvent solution, rinsing the PC solution with water to obtain a crude solution, making it acidic with hydrochloric acid and rinsing it with water repeatedly until its water-phase conductivity becomes almost the same as that of ion exchange water. As a more efficient method, it can be manufactured by reducing the water content of a PC organic solvent solution obtained after the reaction of PC manufactured by interfacial polymerization to a value below the saturation solubility of the organic solvent to liberate and solidify water-soluble impurities such as alkali metal chlorides, alkali hydroxides and unreacted dihydroxy compounds and filtering the solution to remove the liberalized and solidified water-soluble impurities (JP-A 5-186583). Further, it can also be manufactured by mixing a crude solution of PC obtained by interfacial polymerization with water, separating the water by centrifugation at least once to obtain a PC solution I (centrifuging step), removing water from the obtained PC solution I to obtain a PC solution II containing water-soluble impurities precipitated as solid matter (water removing step), separating the solid matter from the obtained PC solution II to obtain a PC solution III (separating step), and collecting PC from the obtained PC solution III (collecting step) (JP-A 2003-26793). It can also be manufactured by mixing an organic solvent solution of PC manufactured by melt polymerization with water and applying the above method. To determine the amount of the sodium metal of PC obtained by the above manufacturing methods, the sodium metal content of PC can be measured by known methods such as atomic adsorption analysis and ICP mass analysis.

The viscosity average molecular weight (M) of PC is 10,000 to 20,000, preferably 12,000 to 20,000, more preferably 14,000 to 18,000. PC having the above viscosity average molecular weight is preferred because it has sufficiently high strength as an optical material and high melt flowability at the time of molding and is free from molding distortion.

The term "viscosity average molecular weight" as used in the present invention means M obtained by inserting a specific viscosity ($\eta_{sp}$) measured by using a solution of 0.7 g of PC dissolved in 100 ml of methylene chloride at 20° C. into the following equation.

$\eta_{sp}=[\eta]+0.45\times[\eta]^2 c$ ($[\eta]$ is an intrinsic viscosity)

$[\eta]=1.23\times10^{-4} M^{0.83}$ c=0.7

PC is generally obtained by reacting a diphenol with a carbonate precursor by interfacial polymerization or melt polymerization. Typical examples of the diphenol used herein include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly called "bisphenol A"), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. They may be used alone or in combination of two or more.

A homopolymer or copolymer obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene is preferred, and a homopolymer of bisphenol A and a copolymer of 1,1-bis(4-hydroxyphenyl)-3,3,5-trimethylcyclohexane and bisphenol A, 2,2-bis{(4-hydroxy-3-methyl)phenyl}propane or α,α'-bis(4-hydroxyphenyl)-m-diisopropylbenzene are preferred. A homopolymer of bisphenol A is particularly preferred.

A carbonyl halide, carbonate ester or haloformate, specifically phosgene, diphenyl carbonate or dihaloformate of a diphenol is used as the carbonate precursor.

To manufacture PC by reacting the above diphenol with the carbonate precursor by interfacial polymerization or melt polymerization, a catalyst or a diphenol antioxidant may be used as required. PC may be branched PC obtained by copolymerizing a polyfunctional aromatic compound having a functionality of 3 or more, a polyester carbonate resin obtained by copolymerizing an aromatic or aliphatic bifunctional carboxylic acid, or a mixture of two or more of the obtained PC's.

The process for manufacturing PC through a reaction by interfacial polymerization or melt polymerization is known. Refer to JP-A 2001-225503, JP-A 2003-301099 and US Laid-Open Publication 2005-106350, for example.

The terminal OH of PC is generally capped with a monofunctional phenol. The monofunctional phenol is preferably a monofunctional phenol represented by the following general formula (1), more preferably an alkyl-substituted or phenylalkyl-substituted phenol, particularly preferably p-tert-butylphenol or p-cumylphenol.

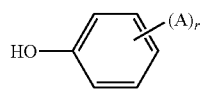

(1)

wherein A is a hydrogen atom, alkyl group having 1 to 9 carbon atoms, or phenylalkyl group (alkyl moiety has 1 to 9 carbon atoms), and r is an integer of 1 to 5, preferably 1 to 3.

These monofunctional phenol terminal capping agents are desirably introduced into at least 5 mol %, preferably at least 10 mol % of the total of all the terminals of the obtained PC. The terminal capping agents may be used alone or in combination of two or more.

After PC is manufactured by a conventionally known method (interfacial polymerization or melt polymerization), it is preferably filtered to be purified after the extraction and removal of an alkali component contained in PC by using pure water in an organic solvent solution or granulation from the organic solvent solution.

It is also preferred that impurities and foreign matter such as a low molecular weight component and an unreacted component should be removed by washing a granular raw material after granulation (solvent removal) with a poor solvent or non-solvent for PC. Examples of the poor solvent or non-solvent for PC include ketones such as acetone, aliphatic hydrocarbons such as hexane and aromatic hydrocarbons such as xylene.

In the extrusion step for obtaining a pellet PC to be injection molded (palletizing step), foreign matter is preferably removed by passing molten PC through a sintered metal filter having a filtration accuracy of 10 µm. Anyway, it is important that the contents of not only sodium but also foreign matter, impurities and solvent in PC should be made as low as possible before injection molding. Additives such as an antioxidant, ultraviolet light absorber and antistatic agent may be used alone or in combination of two or more in PC besides the above stabilizer and release agent.

To mix PC with GMB and other additives in the step (1), a tumbler, twin-cylinder mixer, super mixer, Nauter mixer, Banbury mixer, kneading roll or extruder is used. The thus obtained resin composition powder or pellet may be used directly or after it is pelletized by a melt extruder to be injection molded.

To mix GMB and other additives, they may be mixed in one stage or in two or more stages. To mix them in two stages, after part of the PC powder or pellet is mixed with GMB, that is, a GMB master batch is prepared by diluting GMB with the PC powder, the obtained blend or master batch is mixed with the rest.

To mix GMB and other additives, GMB is added and injected into the extruder directly or after it is heated to be molten. In interfacial polymerization, GMB may be added and dissolved in an organic solvent solution of PC after the end of polymerization.

According to the preparation method for the manufacture of the resin composition of the present invention, there is obtained a resin composition for optical disk substrates having a track pitch of 0.74 µm or less, which comprises an aromatic polycarbonate resin (PC) having a monoglyceride behenate content of 50 to 2,000 ppm, a sodium metal content of 0.05 ppm or less and a viscosity average molecular weight of 10,000 to 20,000 and which has a change rate (%) in the hue (b value) of its injection molded board having a thickness of 2 mm after 10 minutes of heating at 380° C. of 50% or less and a change rate (%) in the light transmittance of 10% or less. Since the sodium content of monoglyceride behenate to be added is made very low in the process for manufacturing the resin composition of the present invention, even when the sodium content of the resin composition is the same as that of other manufacturing process, the amount of sodium around monoglyceride behenate contained in the resin composition can be reduced, which contributes to the reduction of the above change rate in hue and the above change rate in light transmittance.

The track pitch of the optical disk is preferably 0.05 to 0.74 µm, more preferably 0.32 µm, 0.40 µm or 0.74 µm.

PC is preferably obtained from a diphenol such as 2,2-bis(4-hydroxyphenyl)propane, 1,1-bis(4-hydroxyphenyl)-3,3,5-trimethylcyclohexane, α,α'-bis(4-hydroxyphenyl)-m-diisopropylbenzene or a mixture thereof. PC is particularly preferably obtained from 2,2-bis(4-hydroxyphenyl)propane as a diphenol.

The viscosity average molecular weight of PC is preferably 14,000 to 18,000. The sodium metal content of PC is preferably 0.0005 to 0.01 ppm. The monoglyceride behenate content of PC is preferably 200 to 900 ppm, more preferably 350 to 500 ppm.

The resin composition preferably has a change rate in the hue (b value) of its injection molded board having a thickness of 2 mm after 10 minutes of heating at 380° C. of 5 to 40%. The resin composition preferably has a change rate in the light transmittance of its injection molded board having a thickness of 2 mm after 10 minutes of heating at 380° C. of 0.5 to 5%.

Process of Manufacturing a Substrate

The process of manufacturing a substrate of the present invention comprises the steps (1) and (2). The step (1) is as described above. The step (2) is to obtain a substrate having pit tracks, groove tracks, land tracks or land/groove tracks which are arranged at the same interval as the track pitch in the radial direction by injection molding the resin composition obtained in the step (1). In this step, the resin composition can be prepared by carrying out the step (1) or purchasing a resin composition obtained by the step (1).

Injection molding is carried out by melting the resin composition obtained in the step (1) by heating, filling the molten resin composition into the cavity of a mold in which a stamper is installed, applying pressure to the mold, cooling the mold and removing it.

Injection molding can be carried out by using an injection molding machine. Although a commonly used machine may be used as this injection molding machine (including an injection compression molding machine), an injection molding machine having cylinders and screws made of materials which have low adhesion to a resin, high corrosion resistance and high abrasion resistance is preferably used to enhance the reliability of a disk substrate and suppress the production of a carbide.

As injection molding conditions, a cylinder temperature of 350 to 400° C. and a mold temperature of 50 to 140° C. are preferred, whereby an optical disk substrate having excellent optical properties can be obtained. The temperature of the resin is preferably 350 to 400° C.

The environment in the molding step is preferably as clean as possible in consideration of the object of the present invention. It is also important that the material to be molded should be fully dried to remove water and that residence causing the decomposition of the molten resin should be avoided. The sodium metal content of PC is preferably 0.0005 to 0.01 ppm.

According to the process for manufacturing a substrate of the present invention, an optical disk substrate having a track pitch of 0.74 μm or less is obtained from a resin composition which comprises an aromatic polycarbonate resin (PC) having a monoglyceride behenate content of 50 to 2,000 ppm, a sodium metal content of 0.05 ppm or less and a viscosity average molecular weight of 10,000 to 20,000 and which has a change rate (%) in the hue (b value) of its injection molded board having a thickness of 2 mm after 10 minutes of heating at 380° C. of 50% or less and a change rate (%) in the light transmittance of 10' or less.

The track pitch of the optical disk substrate is preferably 0.05 to 0.74 μm. The GMB content of PC is preferably 350 to 500 ppm. The sodium metal content of PC is preferably 0.0005 to 0.01 ppm. The viscosity average molecular weight of PC is preferably 14,000 to 18,000.

The substrate has pit tracks, groove tracks, land tracks or land/groove tracks which are arranged at the same interval as the track pitch in the radial direction. The thickness of the substrate is 1.1 mm or less, preferably 0.6 to 1.1 mm.

Process for Manufacturing an Optical Disk

The process for manufacturing an optical disk of the present invention comprises the steps (1), (2) and (3). The steps (1) and (2) are as described above. The step (3) is to form an information recording/reproduction layer on the pits, grooves, lands or grooves/lands of the substrate obtained in the step (2).

The information recording/reproduction layer is a reflective layer, protective layer, recording layer or interfacial layer. In a read-only optical disk such as DVD-ROM, a reflective film made of Al or Ag, or a translucent film made of Au or Si is formed on pits by sputtering. In a WORM optical disk such as DVD-R, an organic pigment layer made of an azo pigment or cyanine pigment is formed on grooves by spin coating to form a recording layer, and a reflective film made of Au, Ag or alloy is further formed on the recording layer by sputtering. In a rewritable optical disk such as DVD-RAM, a multi-layer film consisting of (protective layer) $SiO_2$/(interfacial layer) ZiS—$SiO_2$/(recording layer) $GeTeSb_2Te_3Sb$/(interfacial layer) ZiS—$SiO_2$/(protective layer) $SiO_2$/(reflective layer) Al alloy is formed on grooves or lands/grooves by sputtering.

PC is preferably obtained from a diphenol such as 2,2-bis (4-hydroxyphenyl)propane, 1,1-bis(4-hydroxyphenyl)-3,3, 5-trimethylcyclohexane, α,α'-bis(4-hydroxyphenyl)-m-diisopropylbenzene or a mixture thereof. Preferably, GMB has a sodium metal content of 0.05 to less than 1 ppm.

An optical disk with a track pitch of 0.74 μm or less comprising a substrate made of an aromatic polycarbonate resin having a monoglyceride behenate content of 50 to 2,000 ppm, a sodium metal content of 0.05 ppm or less and a viscosity average molecular weight of 10,000 to 20,000 is obtained by the step (3).

The optical disk has a track pitch of 0.74 μm or less, preferably 0.05 to 0.74 μm, more preferably 0.32 μm, 0.40 μm or 0.74 μm.

The following optical disks are manufactured by the step (3).

DVD-ROM: substrate, reflective layer

DVD-RAM: substrate, protective layer, interfacial layer, recording layer, interfacial layer, protective layer, reflective layer DVD-R: substrate, recording layer, reflective layer DVD-RW: substrate, protective layer, recording layer, protective layer, reflective layer BD-ROM: substrate, reflective layer BD-RE: substrate, reflective layer, protective layer, interfacial layer, recording layer, interfacial layer, protective layer BD-R: substrate, reflective layer, recording layer HD DVD-ROM: substrate, reflective layer HD DVD-RW: substrate, protective layer, interfacial layer, recording layer, interfacial layer, protective layer, reflective layer HD DVD-R: substrate, recording layer, reflective layer

EXAMPLES

The following examples are provided for the purpose of further illustrating the present invention but are in no way to be taken as limiting. Evaluations were conducted by the following methods.

1. Density of a Cloud

Out of 1,000 substrates having an Al reflective layer, a series of 100 substrates those are taken from ten consecutive substrates of every 100 substrates were used for the measurement of the distribution of the quantity of zero-order diffracted light over the entire surface of each substrate by using the DVD-DOMS (Diffraction Order Measurement System) of Aeco Co., Ltd. To suppress the influence of disturbance such as the attachment state of the stamper, the above molding and measurement were carried out 10 times on each material sample by intervening the stamper installation and removal steps. Therefore, a total of 10,000 DVD-ROM substrates were molded and 1,000 samples were extracted from the substrates.

The density of a cloud was measured by the following method.

(1) A portion having a change in the quantity of zero-order diffracted light in the radial direction of the disk of 1.2%/ 0.8 mm or more is taken as a preliminary boundary area between a normal area and a cloud area.

(2) The average values of the quantities of zero-order diffracted light on both sides of the boundary area are calculated and the mean value of the average values is taken as a threshold value.

(3) An area having a smaller quantity of zero-order diffracted light than the above threshold value is taken as a true cloud area and an area having a larger quantity of zero-order diffracted light than the above threshold value is taken as a true normal area.

(4) The average quantity of zero-order diffracted light of the area where a cloud is produced and the average quantity of zero-order diffracted light of the normal area other than the above area are obtained from the distribution data of zero-order diffracted light divided into the true cloud area and the true normal area by the operation (3) to calculate the difference between them based on the following equation (1). The quantity of diffracted light is represented by its ratio to the quantity of incident light, that is, reflectance (%).

density of cloud (%)=average quantity of zero-order diffracted light of normal area (%)−average quantity of zero-order diffracted light of cloud area (%)     (1)

When the grooves are deformed as shown in FIG. 1, the diffraction efficiency changes and the quantity of zero-order diffracted light decreases. Therefore, the calculated difference (cloud density) can be used as an index for the degree of a cloud. That is, as the numerical value of the density of a cloud becomes larger, a change in the quantity of reflected light caused by the cloud increases, the target quantity of reflected light intended at the time of designing the master is not obtained, and a reproduction signal error and a "tracking signal" error occur. For the evaluation of each material sample, the average value of measurement data obtained by molding and measurement which were repeated 10 times was taken as the density of a cloud.

2. Hue and Light Transmittance

After a sample pellet was dried at 120° C. for 5 hours, test samples (70 mm long, 50 mm wide and 2 mm thick) were prepared by retaining the sample pellet in the J85ELII injection molding machine of The Japan Steel Works, Ltd. at a cylinder temperature of 380° C. for 10 minutes and without retaining the sample pellet in the above injection molding machine to measure their hues (b values). The light transmittances of the test samples were measured at a wavelength of 405 nm by the U-4100 spectrophotometer of Hitachi, Ltd. Change rates in hue and light transmittance were calculated from the following equations.

Change rate in hue (%)={hue (after residence at 380° C.)/hue (before residence at 380° C.))×100−100

Change rate in light transmittance (%)=100−{light transmittance (after residence at 380° C.)/light transmittance (before residence at 380° C.)}×100

3. White Defect

After an optical disk substrate (120 mm in diameter, 1.2 mm in thickness) molded by using the DISK3MIII injection molding machine of Sumitomo Heavy Industries, Ltd. was left in a thermo-hydrostat set to a temperature of 80° C. and a relative humidity of 85% for 168 hours, the number of white points as large as 20 μm or more in the substrate was counted. This was made on 25 optical disk substrates, and the average value of the measurement data was obtained and taken as the number of white points.

4. Deposit 4,000 optical disk substrates (120 mm in diameter, 0.6 mm in thickness) were molded at a cylinder temperature of 380° C. and a mold temperature of 120° C. by using the DISK3MIII injection molding machine of Sumitomo Heavy Industries, Ltd. and a stain adhered to the stamper after molding was wiped off with a nonwoven fabric immersed in methylene chloride. Thereafter, the nonwoven fabric was immersed in 80 ml of methylene chloride for 24 hours and taken out to evaporate methylene chloride so as to measure the weight of the residual solid matter. This was repeated three times for each material sample to calculate the average value of the measurement data.

5. Method of Measuring Sodium Metal Content

Sodium Metal Content of GMB:

5 g of a sample was dissolved in 50 ml of methylene chloride, and 80 ml of pure water was added to the resulting solution under agitation to determine the amount of metal sodium dissolved in pure water by ion chromatography. Sodium metal contents of PC and pellet: About 1 g of a sample was ashed, the ashed product was thermally decomposed with hydrochloric acid and dissolved in diluted nitric acid to obtain a solution, and the solution was measured by an atomic absorption photometer.

Synthetic Example 1

Synthesis of Aromatic Polycarbonate Powders 219.4 parts of ion exchange water and 40.2 parts of a 48% aqueous solution of sodium hydroxide were fed to a reactor equipped with a thermometer, stirrer and reflux cooler, 57.5 parts (0.252 mol) of 2,2-bis(4-hydroxyphenyl)propane and 0.12 part of hydrosulfite were dissolved in the resulting solution, 181 parts of methylene chloride was added, and 28.3 parts of phosgene was blown into the resulting solution under agitation at 15 to 25° C. over 40 minutes. After the end of blowing phosgene, 7.2 parts of a 48% aqueous solution of sodium hydroxide and 2.48 parts of p-tert-butylphenol were added, agitation was started, and 0.06 part of triethylamine was added after emulsification and stirred at 28 to 33° C. for 1 hour to terminate a reaction.

After the reaction product was diluted with methylene chloride and washed with water, it was made acidic with hydrochloric acid and washed with water, and methylene chloride was evaporated with a kneader having an isolation chamber with an outlet for taking out foreign matter in a bearing when the conductivity of the water phase became almost the same as that of ion exchange water to obtain powders having a viscosity average molecular weight of 15,000. 0.01 wt % of tris(2,4-di-tert-butylphenyl)phosphite was added to the powders to obtain aromatic polycarbonate powders.

The sodium metal content of the obtained polycarbonate powders was 0.008 ppm.

Examples 1 and 2

Step (1)

A release agent shown in Table 1 was added and mixed in an amount shown in Table 1 with 100 parts by weight of the above aromatic polycarbonate powders, and they were melt kneaded together under deaeration at a cylinder temperature of 220° C. by a vented double-screw extruder (TEX-30α of The Japan Steel Works, Ltd.) to obtain a pellet. The release agent shown in Table 1 manufactured by Riken Vitamin Co., Ltd. was used. The resin composition was molded into a test sample for the evaluation of hue and light transmittance. The results are shown in Table 1.

Step (2)

A DVD-ROM substrate (track pitch of 0.74 μm) was molded from the pellet obtained in the step (1) by using a DVD mold manufactured by Kata System Co., Ltd. (stamper inner diameter of 22 mm, provided with a stamper on a movable side) and the M-35B-D-DM injection molding machine of Meiki Co., Ltd. at a cylinder temperature of 375° C., a mold temperature (movable side) of 111° C., a mold temperature (fixed side) of 105° C., a release air blow pressure (movable side) of 3.0 kgf/cm$^2$, a release air blow pressure (fixed side) of 6.0 kgf/cm$^2$, a release air blow delay time of 1.0 sec, a clamping force (primary) of 0.0 ton×0.37 sec, a clamping force (secondary) of 18.8 tons×3.44 sec, a clamping force (tertiary) of 0.0 ton×9.90 sec, an injection speed of 149 mm/sec, a maintained pressure of 20 kgf/cm$^2$, a pressure retention time of 0.32 sec and a cooling time of 3.7 sec.

The white defect and deposit at the time of molding of the optical disk substrate were evaluated. The results are shown in Table 1.

(Step (3))

An Al reflective film was formed on the signal side of the DVD-ROM substrate by sputtering to evaluate the density of a cloud. The results are shown in Table 1. Further, a UV curable adhesive was applied to the Al reflective film of the substrate, a second DVD-ROM substrate without an Al reflective film was assembled with the above substrate in such a manner that it was opposed to the Al reflective film, the assembly was turned at a high speed by a spinner to spread the adhesive between these substrates by centrifugal force, and the adhesive was cured by applying UV light thereto from an UV lamp to obtain a DVD-ROM.

Comparative Examples 1 to 4

A release agent shown in Table 1 was added and mixed in the same manner as in Examples to obtain a pellet in the same manner. A DVD-ROM substrate and a DVD-ROM were manufactured by using this pellet to evaluate the density of a cloud, hue, light transmittance and a deposit. The results are shown in Table 1.

TABLE 1

| | Unit | Ex. 1 | Ex. 2 | C. Ex. 1 | C. Ex. 2 | C. Ex. 3 | C. Ex. 4 |
|---|---|---|---|---|---|---|---|
| Release agent | | Glycerin mono-behenate | Glycerin mono-behenate | Glycerin mono-behenate | Glycerin mono-stearate | Glycerin mono-stearate | Glycerin mono behenate |
| Amount of release agent | Parts by weight | 0.0420 | 0.0420 | 0.0400 | 0.0420 | 0.0400 | 0.2500 |
| Sodium metal content of release agent | ppm | 0.4 | 0.9 | 10.1 | 0.2 | 9.8 | 0.4 |
| Density of a cloud | % | 0.827 | 0.826 | 0.831 | 1.072 | 1.224 | 0.809 |
| Hue (before residence at 380° C.) | — | 3.07 | 3.10 | 3.33 | 3.04 | 3.27 | 3.54 |
| Hue (after residence at 380° C.) | — | 4.24 | 4.39 | 5.61 | 4.51 | 6.03 | 4.88 |
| Change rate of hue | % | 38 | 42 | 68 | 48 | 84 | 38 |
| Light transmittance (before residence at 380° C.) | % | 88.43 | 88.45 | 88.09 | 88.53 | 88.12 | 88.29 |
| Light transmittance (after residence at 380° C.) | % | 85.25 | 85.02 | 81.55 | 85.37 | 82.65 | 85.06 |
| Change rate of light transmittance | % | 4 | 4 | 7 | 4 | 6 | 4 |
| White defects | Number per substrate | 0.71 | 0.80 | 4.2 | 0.64 | 3.76 | 1.13 |
| Deposit | mg | 3.5 | 3.1 | 3.2 | 3.3 | 3.3 | 7.5 |

Ex. Example
C. Ex.: comparative Example

It is understood from Table 1 that the density of a cloud can be reduced by using monoglyceride behenate having a sodium metal content of less than 1 ppm. It is also understood that the deterioration of hue and light transmittance can be prevented. It is also understood that the contamination of the mold and the stamper and an increase in the number of white defects can be prevented.

EFFECT OF THE INVENTION

According to the present invention, the production of a cloud caused by a release failure can be suppressed, thereby making it possible to manufacture an optical disk and a substrate thereof efficiently. Further, according to the present invention, the deterioration of hue and light transmittance caused by high-temperature molding can be prevented, thereby making it possible to manufacture an optical disk having excellent optical properties and a substrate thereof. According to the present invention, a resin composition which has high releasability and excellent heat stability and is suitable for molding a high-density optical disk substrate can be manufactured.

The high-density optical disk of the present invention is excellent in heat stability, hydrolytic resistance and optical properties. The high-density optical disk substrate of the present invention is excellent in hydrolytic resistance and has only a small number of white points even when it is kept at a high temperature and a high humidity. Therefore, there can be provided a high-density optical disk having excellent optical properties. The resin composition of the present invention has such high heat stability that it rarely changes in hue and light transmittance even when it is kept at a high temperature as well as excellent releasability.

INDUSTRIAL FEASIBILITY

The present invention can be applied to high-density optical disks such as DVD, Blu-ray disk and HD DVD.

The invention claimed is:

1. A process for manufacturing an optical disk having a track pitch of 0.74 μm or less, comprising the steps of:
   (1) preparing a resin composition by adding 0.005 to 0.2 part by weight of monoglyceride behenate to 100 parts by weight of an aromatic polycarbonate resin;
   (2) injection molding the resin composition to obtain a substrate having pit tracks, groove tracks, land tracks or land/groove tracks which are arranged at the same interval as the track pitch in the radial direction; and
   (3) forming an information recording/reproduction layer on the pits, grooves, lands or grooves/lands of the substrate, wherein
   the aromatic polycarbonate resin has a sodium metal content of 0.0005 to 0.05 ppm and a viscosity average molecular weight of 10,000 to 20,000, and
   the monoglyceride behenate has a sodium metal content of less than 1 ppm.

2. The manufacturing process according to claim 1, wherein the aromatic polycarbonate resin is obtained from 2,2-bis(4-hydroxyphenyl)propane, 1,1-bis(4-hydroxyphenyl)-3,3,5-trimethylcyclohexane, α,α'-bis(4-hydroxyphenyl)-m-diisopropylbenzene or a mixture thereof as a diphenol.

3. The production process according to claim 1, wherein the monoglyceride behenate has a sodium metal content of 0.05 to less than 1 ppm.

4. The manufacturing process according to claim 1, wherein the optical disk has a track pitch of 0.05 to 0.74 μm.

5. The manufacturing process according to claim 1, wherein the optical disk has a track pitch of 0.32 μm, 0.40 μm or 0.74 μm.

6. A process for manufacturing an optical disk substrate having a track pitch of 0.74 μm or less, comprising the steps of:
   (1) preparing a resin composition by adding 0.005 to 0.2 part by weight of monoglyceride behenate to 100 parts by weight of an aromatic polycarbonate resin; and
   (2) injection molding the resin composition to obtain a substrate having pit tracks, groove tracks, land tracks or land/groove tracks which are arranged at the same interval as the track pitch in the radial direction, wherein
   the aromatic polycarbonate resin has a sodium metal content of 0.0005 to 0.05 ppm and a viscosity average molecular weight of 10,000 to 20,000, and
   the monoglyceride behenate has a sodium metal content of less than 1 ppm.

7. The production process according to claim 6, wherein the aromatic polycarbonate resin has a sodium metal content of 0.0005 to 0.01 ppm.

8. A process for manufacturing a resin composition for optical disk substrates having a track pitch of 0.74 μm or less, comprising the step (1) of obtaining a resin composition by adding 0.005 to 0.2 part by weight of monoglyceride behenate to 100 parts by weight of an aromatic polycarbonate resin, wherein
   the aromatic polycarbonate resin has a sodium metal content of 0.0005 to 0.05 ppm and a viscosity average molecular weight of 10,000 to 20,000, and
   the monoglyceride behenate has a sodium metal content of less than 1 ppm.

9. The manufacturing process according to claim 8, wherein the aromatic polycarbonate resin has a sodium metal content of 0.0005 to 0.01 ppm.

10. An optical disk having a track pitch of 0.74 μm or less, comprising a substrate made of an aromatic polycarbonate resin having a monoglyceride behenate content of 50 to 2,000 ppm, a sodium metal content of 0.05 ppm or less and a viscosity average molecular weight of 10,000 to 20,000.

11. The optical disk according to claim 10, wherein the track pitch is 0.05 to 0.74 μm.

12. The optical disk according to claim 10, wherein the track pitch is 0.32 μm, 0.40 μm or 0.74 μm.

13. An optical disk substrate having a track pitch of 0.74 μm or less, made of a resin composition which comprises an aromatic polycarbonate resin having a monoglyceride behenate content of 50 to 2,000 ppm, a sodium metal content of 0.05 ppm or less and a viscosity average molecular weight of 10,000 to 20,000 and which has a change rate (%) in the hue (b value) of its injection molded board having a thickness of 2 mm after 10 minutes of heating at 380° C. of 50% or less and a change rate (%) in the light transmittance of 10% or less.

14. The substrate according to claim 13, wherein the aromatic polycarbonate resin has a monoglyceride behenate content of 350 to 500 ppm.

15. The substrate according to claim 13, wherein the aromatic polycarbonate resin has a sodium metal content of 0.0005 to 0.01 ppm.

16. The substrate according to claim 13, wherein the aromatic polycarbonate resin has a viscosity average molecular weight of 14,000 to 18,000.

17. A resin composition for optical disk substrates having a track pitch of 0.74 μm or less, which comprises an aromatic polycarbonate resin having a monoglyceride behenate content of 50 to 2,000 ppm, a sodium metal content of 0.05 ppm or less and a viscosity average molecular weight of 10,000 to 20,000 and which has a change rate (%) in the hue (b value) of its injection molded board having a thickness of 2 mm after 10 minutes of heating at 380° C. of 50% or less and a change rate (%) in the light transmittance of 10% or less.

18. The resin composition according to claim 17, wherein the aromatic polycarbonate resin is obtained from 2,2-bis(4-hydroxyphenyl)propane, 1,1-bis(4-hydroxyphenyl)-3,3,5-trimethylcyclohexane, α,α'-bis(4-hydroxyphenyl)-m-diisopropylbenzene or a mixture thereof as a diphenol.

19. The resin composition according to claim 17, wherein the aromatic polycarbonate resin is obtained from 2,2-bis(4-hydroxyphenyl)propane as a diphenol.

20. The resin composition according to claim 17, wherein the aromatic polycarbonate resin has a viscosity average molecular weight of 14,000 to 18,000.

21. The resin composition according to claim 17, wherein the aromatic polycarbonate resin has a sodium metal content of 0.0005 to 0.01 ppm.

22. The resin composition according to claim 17, wherein the aromatic polycarbonate resin has a monoglyceride behenate content of 200 to 900 ppm.

23. The resin composition according to claim 17, wherein the aromatic polycarbonate resin has a monoglyceride behenate content of 350 to 500 ppm.

24. The resin composition according to claim 17, which has a change rate (%) in the hue (b value) of its injection molded board having a thickness of 2 mm after 10 minutes of heating at 380° C. of 5 to 40%.

25. The resin composition according to claim 17, which has a change rate (%) in the light transmittance of its injection molded board having a thickness of 2 mm after 10 minutes of heating at 380° C. of 0.5 to 5%.

* * * * *